(12) United States Patent
Zahavi et al.

(10) Patent No.: US 8,015,327 B1
(45) Date of Patent: Sep. 6, 2011

(54) TECHNIQUES FOR MONITORING AND MANAGING WAIT QUEUES

(75) Inventors: William Zahavi, Westborough, MA (US); Wolfgang Klinger, Whitinsville, MA (US); Alexander V. Dunfey, Waltham, MA (US); M. Michael Hadavi, Shrewsbury, MA (US); James L. Davidson, Tyngsboro, MA (US)

(73) Assignee: EMC Corporation, Hopkinton, MA (US)

( * ) Notice: Subject to any disclaimer, the term of this patent is extended or adjusted under 35 U.S.C. 154(b) by 180 days.

(21) Appl. No.: 11/901,335

(22) Filed: Sep. 17, 2007

(51) Int. Cl.
*G06F 3/00* (2006.01)
*G06F 5/00* (2006.01)

(52) U.S. Cl. ........................................... 710/52; 710/57
(58) Field of Classification Search ................ 710/52, 710/53, 57
See application file for complete search history.

(56) References Cited

U.S. PATENT DOCUMENTS

| | | | |
|---|---|---|---|
| 5,206,939 A | 4/1993 | Yanai et al. | |
| 5,541,912 A * | 7/1996 | Choudhury et al. | 370/412 |
| 5,590,366 A * | 12/1996 | Bryant et al. | 709/235 |
| 5,778,394 A | 7/1998 | Galtzur et al. | |
| 5,845,147 A | 12/1998 | Vishlitzky et al. | |
| 5,857,208 A | 1/1999 | Ofek | |
| 6,289,383 B1 * | 9/2001 | Rhine | 709/227 |
| 6,977,930 B1 * | 12/2005 | Epps et al. | 370/392 |
| 7,133,805 B1 * | 11/2006 | Dankenbring et al. | 702/186 |
| 7,284,052 B1 * | 10/2007 | Anderson | 709/226 |
| 7,292,957 B1 * | 11/2007 | Schell | 702/182 |
| 7,305,537 B1 * | 12/2007 | Moore et al. | 711/167 |
| 7,395,537 B1 * | 7/2008 | Brown et al. | 718/104 |
| 7,424,742 B1 * | 9/2008 | Dash et al. | 726/22 |
| 7,433,947 B1 * | 10/2008 | Iyer et al. | 709/224 |
| 7,478,179 B2 * | 1/2009 | Moore et al. | 710/40 |
| 7,756,940 B2 * | 7/2010 | Sagawa | 709/207 |
| 2002/0152303 A1 * | 10/2002 | Dispensa | 709/224 |
| 2005/0157856 A1 * | 7/2005 | Humphries | 379/88.17 |
| 2006/0059257 A1 * | 3/2006 | Collard et al. | 709/224 |
| 2007/0088895 A1 * | 4/2007 | Gustafson et al. | 710/306 |
| 2007/0198701 A1 * | 8/2007 | Pindra et al. | 709/224 |
| 2007/0208849 A1 * | 9/2007 | Ely et al. | 709/224 |

* cited by examiner

*Primary Examiner* — Tariq Hafiz
*Assistant Examiner* — Dayton Lewis-Taylor
(74) *Attorney, Agent, or Firm* — Muirhead and Saturnelli, LLC

(57) ABSTRACT

Described are techniques for managing a wait queue in a system. A plurality of buckets associated with the wait queue are defined. Each of the plurality of buckets is associated with one of more queue depth values and one or more counters. For each received request for service, a current depth of the wait queue indicating a number of other requests included in the wait queue waiting to be serviced is determined, a bucket in accordance with the current depth of the wait queue is selected and information is recorded by updating said one or more counters of the bucket selected. The received request is placed in the wait queue if there is another request currently being serviced or if there is at least one other request currently in the wait queue.

20 Claims, 10 Drawing Sheets

| Queue Depth Bucket | EC at t1 | EC at t2 | Change in Event Count (EC) for t2 - t1 | | CQD at t1 | CQD at t2 | Change in cumulative queue depth (CQD) for t2 - t1 | | Ave. Queue Depth (AQD) | Queue Depth distribution | Ave. Response Time (ART) |
|---|---|---|---|---|---|---|---|---|---|---|---|
| = 0 | 3802860 | 4196113 | 393253 | | 0 | 0 | 0 | | 0.00 | 25.48% | 0.000126 |
| <= 5 | 10551547 | 11638495 | 1086948 | | 29326954 | 32347313 | 3020359 | | 2.78 | 70.43% | 0.000477 |
| <=10 | 403648 | 444925 | 41277 | | 2759211 | 3041610 | 282399 | | 6.84 | 2.67% | 0.00099 |
| <= 20 | 71164 | 79010 | 7846 | | 1031644 | 1145821 | 114177 | | 14.55 | 0.51% | 0.001963 |
| <= 40 | 89743 | 99339 | 9596 | | 2703175 | 2992071 | 288896 | | 30.11 | 0.62% | 0.003926 |
| <= 80 | 43138 | 47334 | 4196 | | 2166077 | 2377241 | 211164 | | 50.33 | 0.27% | 0.006478 |
| <= 160 | 6637 | 6896 | 259 | | 828930 | 852902 | 23972 | | 92.56 | 0.02% | 0.011807 |

FIG. 5

TECHNIQUES FOR MONITORING AND MANAGING WAIT QUEUES

BACKGROUND

1. Technical Field

This application generally relates to system monitoring, and more particularly to techniques used in connection with monitoring and management of data storage and other systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In connection with a data storage system as well as other systems, data may be gathered to monitor the system performance. At defined time intervals or polling intervals, data, such as various counters or other metrics, may be gathered in order to gauge system performance. Complex systems, such as data storage systems, may include many components about which data is obtained at each sampling time. As the number of components increases, the amount of data which is gathered at each polling interval increases accordingly using more time and resources of the system to obtain the data about the system. Thus, it becomes more difficult to sample data at a high rate of frequency as the complexity of system increases.

One existing technique for evaluating the gathered data determines changes in counter values relative to the time difference between samplings. For example, an average value of a counter may be determined for a polling interval by determining a change in each counter value relative to the change in time since the last set of sample data was obtained. Use of the average values provides information regarding average performance during the polling interval but does not provide more detailed information about system activity and performance occurring within the polling interval. For example, if data is sampled every 10 minutes, counter values determined using the foregoing existing technique reflect an average for the 10 minute time period. The average counters do not provide further detail or breakdown as the activity level may vary within the 10 minute interval. If a burst of activity occurs during the first 5 minutes of the sampling period, the data gathered only provides an average and does not provide more detailed information regarding what actually occurred in the system during the first 5 minutes of the sampling period when activity may have been at its peak for the sampling period. Using the existing technique of averaging, the polling interval rate may be decreased to 5 minutes to collect such data. However, it may not be desirable or even possible to increase the polling frequency rate to obtain such information depending on the complexity of the system being monitored. Furthermore, existing techniques to collect the added data associated with increased polling frequency may interfere with normal system activity as well as create very large data files that may be cumbersome to process.

Thus, it may be desirable to utilize a technique for identifying an activity level distribution providing information about system performance during a polling interval independent of the polling interval time. The technique may provide information associated with varying levels of activity occurring during a polling interval.

SUMMARY OF THE INVENTION

In accordance with one aspect of the invention is a method for managing a wait queue in a system comprising: defining a plurality of buckets associated with the wait queue, each of the plurality of buckets being associated with one of more queue depth values and one or more counters; and for each received request for service, performing: determining a current depth of the wait queue indicating a number of other requests included in the wait queue waiting to be serviced; selecting a bucket in accordance with the current depth of the wait queue; recording information by updating said one or more counters of the bucket selected; and placing the received request in the wait queue if there is another request currently being serviced or if there is at least one other request currently in the wait queue. The system may be a data storage system and the wait queue may be associated with all incoming I/O requests received by the data storage system. The one or more counters associated with each bucket may include an event count and a cumulative queue depth, the event count representing a number of events associated with said each bucket as selected in said selecting step, the cumulative queue depth representing the sum of queue depths recorded for said each bucket in accordance with each received request selecting said each bucket. The selecting step selecting a first bucket may further comprise: incrementing by one the event count associated with the first bucket; and incrementing the cumulative queue depth associated with the first bucket by the current depth of the wait queue. The method may also include reporting, in accordance with a polling interval, collected data, said collected data including values associated with said one or more counters for each of said plurality of buckets and a value indicating an amount of time the system is busy servicing requests. The method may include determining, for each of said plurality of buckets, an average queue depth using the event count and cumulative queue depth associated with said each bucket. The method may include determining an average service time for said polling interval, said average service time being determined in accordance with the elapsed time of said polling interval and a total number of requests received during the polling interval, the total number of requests determined by adding the event counts associated with said plurality of buckets. The method may include determining, for each of said plurality of buckets, an average response time in accordance with the average queue depth for said each bucket and the average service time for said polling interval. The method may include determining, for each of said plurality of buckets, a percentage of requests included in said each bucket in accordance with said event count for said each bucket and the total number of requests. The method may include determining a cumulative percentage value based on a sum of percentages of requests included in two or more buckets representing a range of queue depths associated with the wait queue, a first response time being the average response time associated with a first of said two or more buckets having a maximum queue depth of said range; and monitoring whether said system is performing in accordance with at least one quality of service level associated with a service agreement response time, said monitoring including comparing said cumulative percentage value to said service agreement response time. The system may be a data storage system and the wait queue may be associated with at least one component of the data storage system in connection with servicing I/O requests received by the data storage system which are serviced by the at least one component.

In accordance with another aspect of the invention is a method for monitoring performance of a data storage system comprising: receiving configuration information for a wait queue, said configuration information defining a plurality of buckets associated with the wait queue, each of the plurality of buckets being associated with one of more wait queue depth values indicating a size of the wait queue and one or more counters, the wait queue including received I/O requests waiting to be serviced by at least one component of the data storage system; for each received I/O request to be serviced, performing by the data storage system: determining a current depth of the wait queue indicating a number of other I/O requests included in the wait queue waiting to be serviced; selecting a bucket in accordance with the current depth of the wait queue; recording information by updating said one or more counters of the bucket selected; and placing the received I/O request in the wait queue if there is another I/O request currently being serviced, or if there is at least one other I/O request currently in the wait queue; reporting, by the data storage system in accordance with a polling interval, collected data to a management system, said collected data including values associated with said one or more counters for each of said plurality of buckets and a value indicating an amount of time the at least component is busy servicing I/O requests; and determining, by the management system for each of said plurality of buckets, an average response time for said polling interval using said collected data for said polling interval. The method may also include determining a percentage value indicating a percentage of I/O requests included in two or more buckets for said polling interval, said two or more buckets representing a range of queue depth values associated with the wait queue, a first response time being the average response time associated with a first of said two or more buckets having a maximum queue depth of said range; and monitoring whether said at least one component of the data storage system is performing in accordance with at least one quality of service level associated with a service agreement response time, said monitoring including comparing said percentage value to said service agreement response time. For the polling interval, the average response time for each of said plurality of buckets and a percentage of I/O requests associated with each of said plurality of buckets may be displayed in graphical form at the management system.

In accordance with another aspect of the invention is a computer readable medium comprising code stored thereon for managing a wait queue in a data storage system, the computer readable medium comprising code stored thereon for: defining a plurality of buckets associated with the wait queue, each of the plurality of buckets being associated with one of more queue depth values and one or more counters; and for each received request for service, performing: determining a current depth of the wait queue indicating a number of other requests included in the wait queue waiting to be serviced; selecting a bucket in accordance with the current depth of the wait queue; recording information by updating said one or more counters of the bucket selected; and placing the received request in the wait queue if there is another request currently being serviced or if there is at least one other request currently in the wait queue. The wait queue may be associated with incoming I/O requests received by the data storage system. The one or more counters associated with each bucket may include an event count and a cumulative queue depth, the event count representing a number of events associated with said each bucket as selected in said selecting step, the cumulative queue depth representing the sum of queue depths recorded for said each bucket in accordance with each received request selecting said each bucket, and said code for selecting step selecting a first bucket may further comprise code for: incrementing by one the event count associated with the first bucket; and incrementing the cumulative queue depth associated with the first bucket by the current depth of the wait queue. The computer readable medium may further comprise code for: reporting, in accordance with a polling interval, collected data, said collected data including values associated with said one or more counters for each of said plurality of buckets and a value indicating an amount of time the system is busy servicing requests. The computer readable medium may further comprise code for: determining, for each of said plurality of buckets, an average queue depth using the event count and cumulative queue depth associated with said each bucket; determining an average service time for said polling interval, said average service time being determined in accordance with the elapsed time of said polling interval and a total number of requests received during the polling interval, the total number of requests determined by adding the event counts associated with said plurality of buckets; and determining, for each of said plurality of buckets, an average response time in accordance with the average queue depth for said each bucket and the average service time for said polling interval. The computer readable medium may further comprise code for: determining, for each of said plurality of buckets, a percentage of requests included in said each bucket in accordance with said event count for said each bucket and the total number of requests; determining a cumulative percentage value based on a sum of percentages of requests included in two or more buckets representing a range of queue depths associated with the wait queue, a first response time being the average response time associated with a first of said two or more buckets having a maximum queue depth of said range; and monitoring whether said system is performing in accordance with at least one quality of service level associated with a service agreement response time, said monitoring including comparing said cumulative percentage value to said service agreement response time.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5 and 6 are tables of collected data values and derived data values for a polling interval used in connection with the techniques herein;

DETAILED DESCRIPTION OF EMBODIMENT(S)

Figure 1:
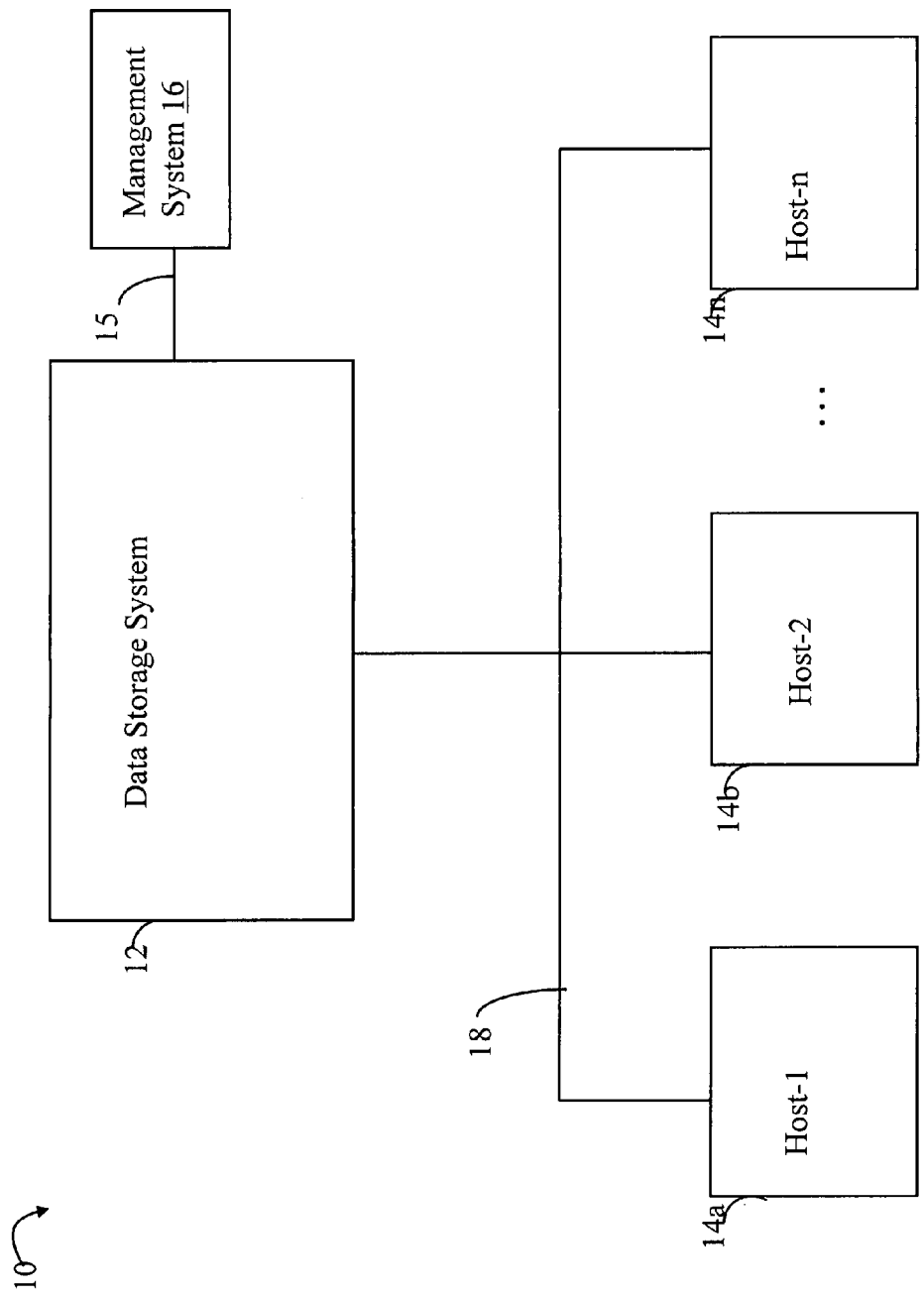
FIG. 1 is an example of an embodiment of a computer system that may utilize the techniques described herein.

Referring to FIG. 1, shown is an example of an embodiment of a computer system that may be used in connection with performing the techniques described herein. The computer system 10 includes a data storage system 12 connected to host systems 14a-14n through communication medium 18. The data storage system 12 is also connected to the management system 16 through communication medium 15. In this embodiment of the computer system 10, and the n hosts 14a-14n may access the data storage system 12, for example, in performing input/output (I/O) operations or data requests. The communication mediums 15, 18 may be any one or more of a variety of networks or other type of communication connections as known to those skilled in the art. The communication mediums 15,18 may be a network connection, bus, and/or other type of data link, such as a hardwire or other connections known in the art. For example, the communication medium 15, 18 may be the Internet, an intranet, network or other wireless or other hardwired connection(s) by which the data storage system 12 communicates with other components, such as the host systems 14a-14n and the management system 16.

Each of the host systems 14a-14n and the data storage system 12 included in the computer system 10 may be connected to the communication medium 18 by any one of a variety of connections as may be provided and supported in accordance with the type of communication medium 18. Similarly, the data storage system 12 and management system 16 are also connected to the communication medium 15. The processors included in the host computer systems 14a-14n and the management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail and may vary with each particular embodiment. Each of the host computers 14a-14n, management system 16, and data storage system 12 may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

The management system 16 may be used in connection with facilitating collection and analysis of data regarding performance of the data storage system 12 as well as possibly other components. The management system 16 may include code stored and executed thereon to perform processing of the data collected. The particular data collected as well as the processing that may be performed in connection with analysis of the collected data are described in more detail in following paragraphs. The management system 16 may include any one or more different forms of computer-readable media known in the art upon which the code used in connection with the techniques herein is stored. Computer-readable media may include different forms of volatile (e.g., RAM) and non-volatile (e.g., ROM, flash memory, magnetic or optical disks, or tape) storage which may be removable or non-removable.

Figure 2A:
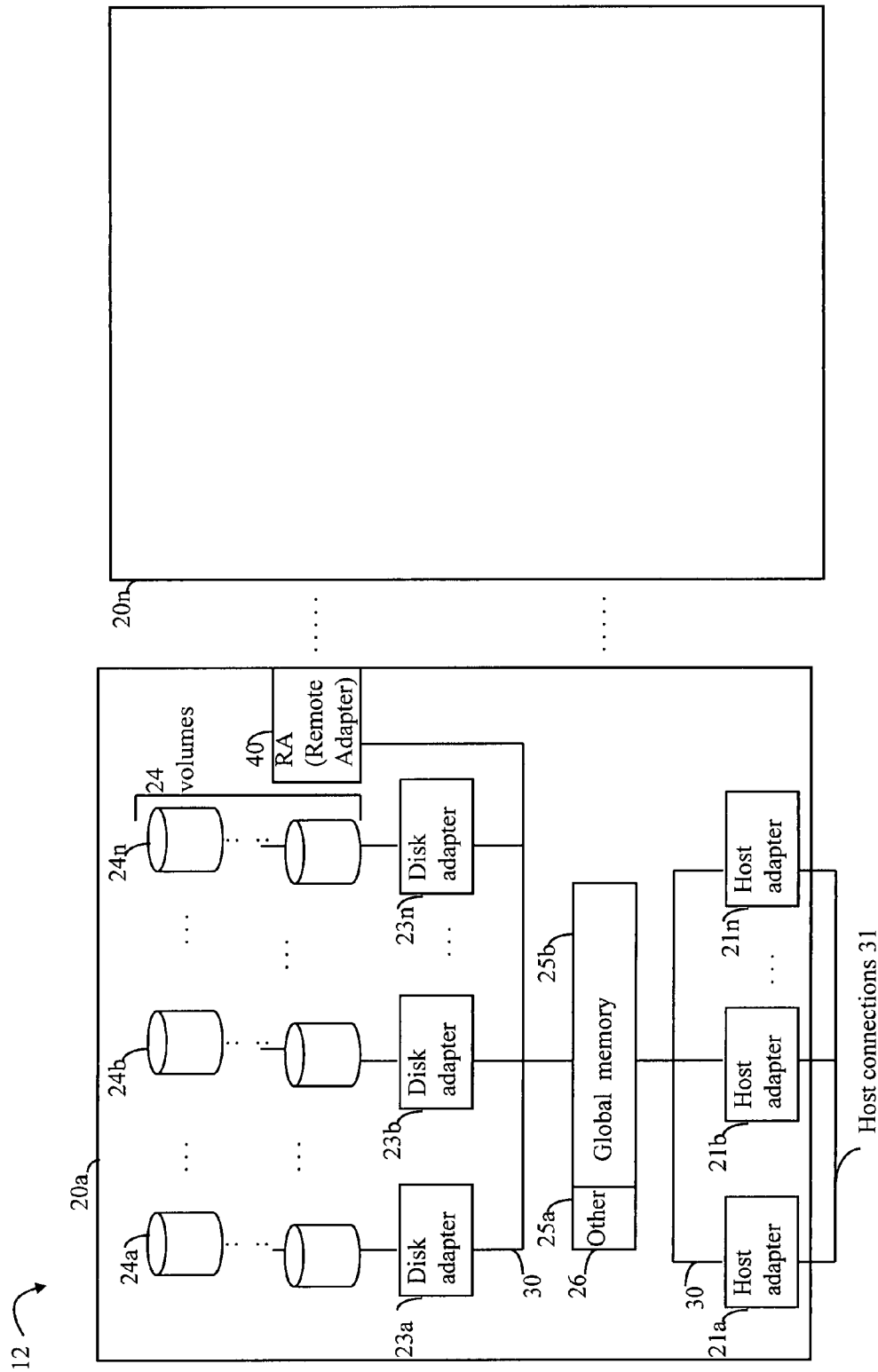
FIG. 2A is an example of an embodiment of a data storage system.

Referring to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the remote adapters (RA's), the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive, or multiple drives. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on a LV may be accessed by the DA following a data request in connection with I/O operations that other directors originate.

Figure 2B:
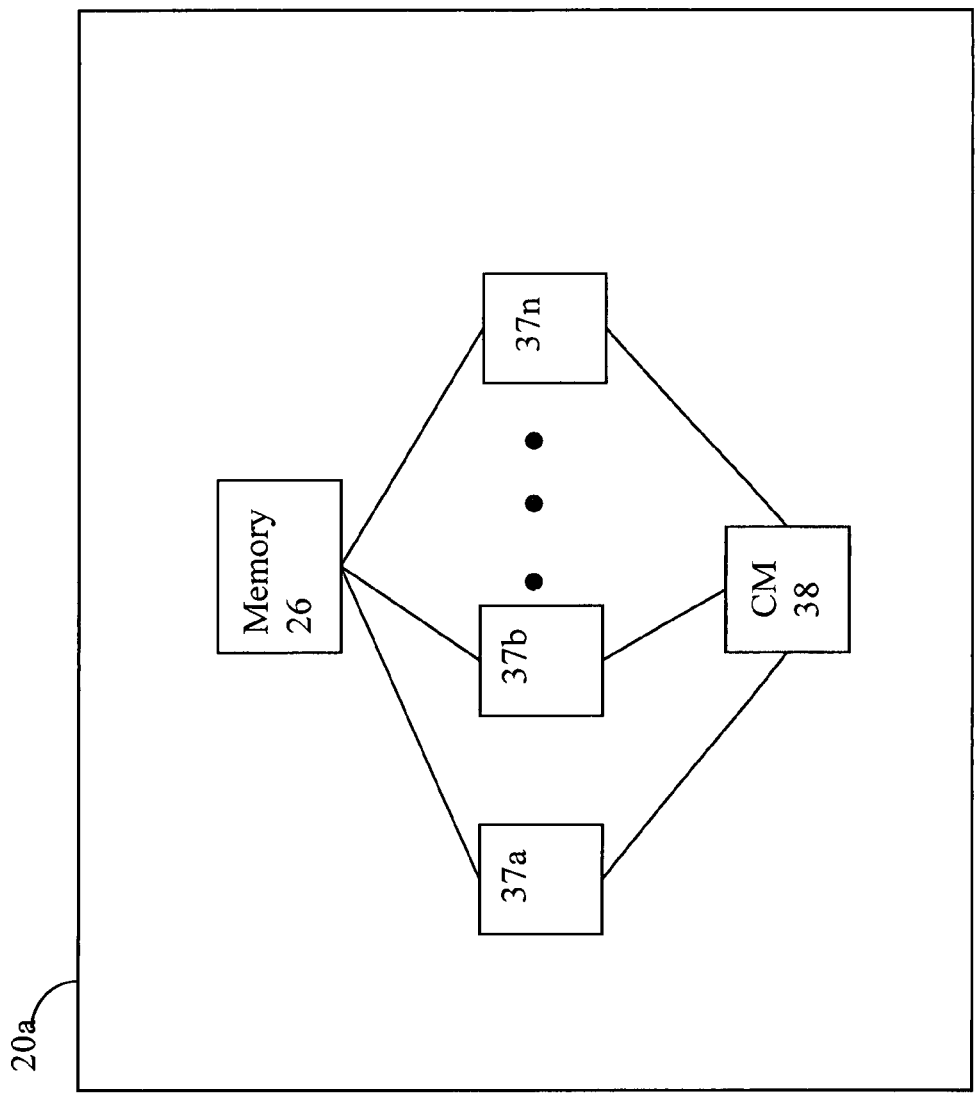
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Each of the data storage systems may include code stored and executed thereon which gathers data regarding performance of the data storage system. The code may report the collected data at various times to the management system 16 for further analysis. The code may be stored on a form of computer-readable media known in the art as described elsewhere herein. The collected data may be reported to the management system 16 in accordance with a defined polling interval. At defined times, the management system 16 may request the collected data from the data storage system. Using another technique, the data storage system may automatically report the collected data to the management system 16 in accordance with a predefined time interval rather than in response to a request from the management system 16.

Described herein are techniques for identifying and quantifying an activity level distribution within each of the sampling periods or polling intervals. As known in the art, one technique for evaluating the gathered data, for example, such as may be reported to the management system by the data storage system 12, determines changes in counter values collected at each polling interval relative to the time difference between samplings. For example, an average value of a counter may be determined for a polling interval by determining a change in each counter value relative to the change in time since the last set of sample data was obtained. Use of the average values provides information regarding average performance during the elapsed time but does not provide more detailed information about system activity and performance occurring within the polling interval. For example, if data is sampled every 10 minutes, counter values determined using the foregoing existing technique reflect an average for the 10 minute time period. The average counters do not provide further detail or breakdown as the activity level may vary within the 10 minute interval. If a burst of activity occurs during the first 5 minutes of the sampling period, the data gathered only provides an average and does not provide more detailed information regarding what actually occurred in the system during the first 5 minutes of the sampling period when activity may have been at its peak for the sampling period. Using the existing technique of averaging, the polling interval rate may be decreased to 5 minutes to collect such data. However, it may not be desirable or even possible to increase the polling frequency rate to obtain such information depending on the complexity of the system being monitored.

Described herein are techniques for identifying an activity level distribution providing information about system performance during a polling interval independent of the polling interval time. In other words, the techniques described herein may be used to provide information associated with varying levels of activity occurring during a polling interval.

In following paragraphs, examples are set forth to describe and illustrate the techniques used in connection with a data storage system. However, it will be appreciated by those skilled in the art that the techniques herein may be used in connection with a variety of different systems and arrangements.

Described herein are techniques for identifying and quantifying activity level distributions at a storage array. The techniques herein manage wait queues for I/O requests waiting to be serviced in such a way that may be used to facilitate identifying bursts of traffic as well as provide a method for measuring quality of service (QOS) levels against service level objectives. The queue depth management technique described herein defines attributes and methods for managing information about potential bottlenecks in a system caused by wait queues having an undesirable depth. Wait queues of I/O requests waiting for service may be maintained for the entire data storage system as well as for each of many logical and physical components of a system including virtualized elements. Externalizing information about the state of the queues, such as in connection with the data collection, reporting, and analysis of the collected data, can assist in identifying potential bottlenecks and performance problems in a complex system. The techniques herein provide more detailed and accurate information about what occurs during a polling interval or sampling period. The techniques may be used to identify the activity level distribution occurring during a sampling period independent of the frequency rate at which the data is reported to the management system (e.g., independent of the polling or sampling interval).

The techniques herein use counters and defined buckets associated with the wait queue. Through analysis of the collected data at defined time intervals, detailed information may be provided regarding activity level distribution within the elapsed time. As described in more detail below, the techniques herein may be used to identify activity bursts (e.g., when a large amount of I/O requests are received) occurring within the elapsed time or polling interval as well as estimate the activity response times based on average measured service times and average measured queue depths. As described in following paragraphs, the foregoing values may be derived from other metrics.

In connection with techniques herein, a value that may be determined is event response time. Response time represents the amount of time it takes to complete an event, such as a complete an I/O operation for a received I/O request. Response time may be characterized as including two components: service time and wait time. Service time is the actual amount of time spent servicing or completing the event. The wait time is the amount of time the event, such as the I/O request, spends waiting in line or queue waiting for service (e.g., prior to executing the I/O operation). Following paragraphs describe ways in which the foregoing values may be determined in accordance with the techniques herein.

Figure 3:
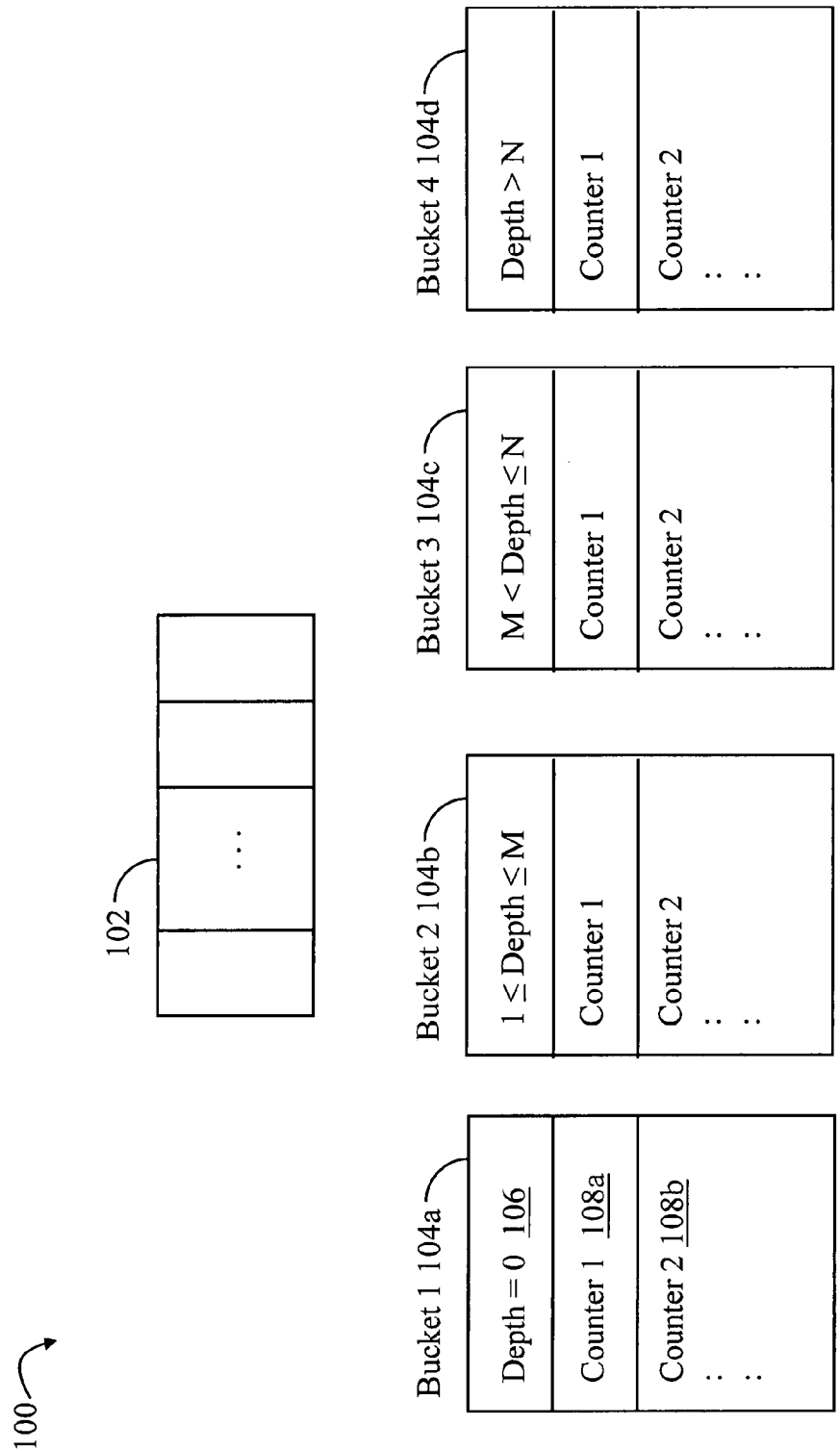
FIGS. 3 and 4 are examples illustrating a wait queue and associated buckets that may utilize the techniques described herein.

Referring to FIG. 3, shown is an example illustration of the techniques herein. A wait queue 102 may include I/O requests received by the data storage system which are waiting for service. Each wait queue 102 may be associated with one or more buckets 104a-104d. Each of the buckets represents a range of values of how long the waiting line or queue is (e.g., the queue depth) upon the arrival of each new I/O request placed in the queue. When a new I/O request is received, the current queue depth of the wait queue is determined. Based on the current queue depth, a particular bucket is selected and information associated with the selected bucket is recorded. Collectively, the buckets 104a-104d may be characterized as buckets of data or recorded information associated with the single wait queue. All I/O requests wait in the queue 102. In accordance with the techniques herein, information is recorded in a different one of the defined buckets with the arrival of each new I/O request. Each bucket, such as 104a, is shown as including a queue depth range 106 associated with the bucket and one or more counters, such as counters 108a and 108b. When a new I/O request is received by the data storage system, the current queue depth of 102 is determined. Based on the current queue depth, one of the buckets 104a-104d is selected. For example, with M=5, N=10, if an I/O request is received and the current queue depth is 4, bucket 2 104b is selected and Counter1 and Counter 2 of 104b are updated. The example 100 includes counters 108a and 108b which can represent any particular information associated and recorded for each queue depth bucket. Particular counters that may be used in an embodiment are described in more detail in following paragraphs.

In the example 100, four buckets 104a-104d are illustrated although the techniques herein may be used in connection with any number of buckets. Each bucket has a defined non-overlapping or mutually exclusive queue depth range with the bucket 104d representing all queue depths greater than a particular value, N. It should be noted that the total range of queue depths does not have to span or cover the entire range of possible queue depths. Rather, as will be illustrated in following paragraphs, the buckets may be used to define the queue depth values and ranges of interest. In this example, each bucket is associated with a range of values. However, a bucket may also be associated with a single queue depth value.

It should be noted that bucket 104a is associated with a queue depth of 0 indicating the condition that a newly received I/O request does not have to wait and can be serviced since no other I/O is currently being serviced. In this example, the queue depth is determined upon the arrival of a newly received I/O request without including the newly received I/O request in the current queue depth measurement. The foregoing may be characterized as a 0-based queue depth measurement.

The number of buckets as well as the range associated with each bucket are configurable values and may vary with embodiment and application. Each bucket may have the same or different number of queue depth values associated therewith. As an example, the number of buckets in an embodiment may reflect the various QOS levels that a data storage system may maintain. The queue depth range of each bucket may reflect the specific service level offering (SLO) for a given wait queue. As another example, an embodiment may configure the number of buckets and range for each bucket in which each bucket may also specify a non-contiguous range. For example, an embodiment may be configured to include two buckets, a first bucket for even queue depth values and a second bucket for odd queue depth values.

It should be noted that the example 100 includes buckets with queue depth ranges that are mutually exclusive. The techniques herein may also be used in an embodiment in which the queue depth ranges associated with each bucket overlap one another. In such an embodiment, more than one bucket may be selected based on the current wait queue depth.

In one use with a data storage system, the wait queue 102 may represent all I/Os by the data storage system waiting for service. An embodiment may, as an alternative to or in addition to the foregoing, maintain other wait queues each associated with a component of the data storage system, such as a each DA.

Figure 4:
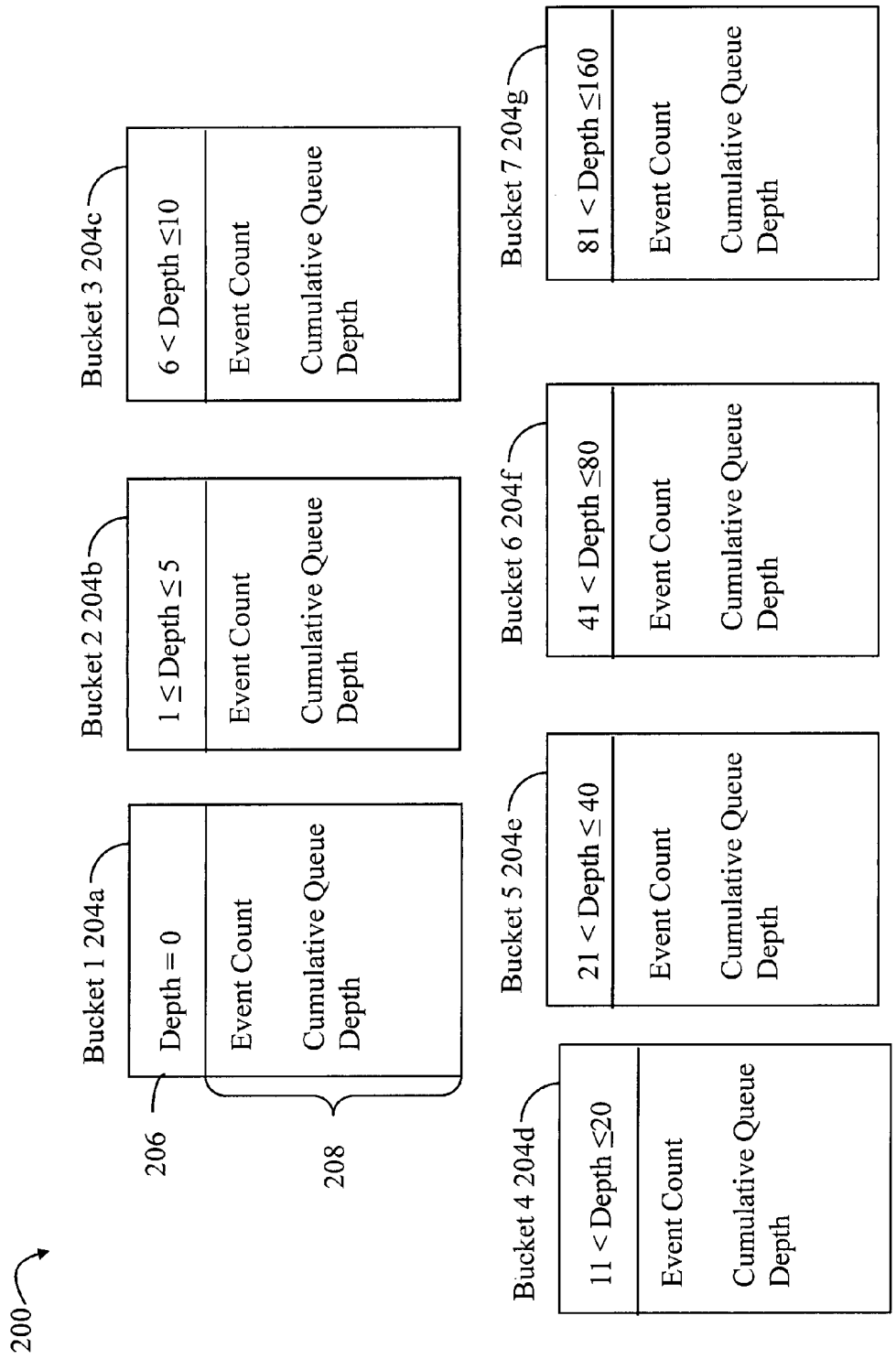

Referring to FIG. 4, shown is an example illustrating the buckets that may be associated with a wait queue, such as I/O requests received for processing by a data storage system. The example 200 defines 7 buckets 204a-204g. Bucket 1 204a has an associated queue depth range of 0 corresponding to the condition as described in connection with bucket 104a of FIG. 3 (e.g., newly received I/O request does not have to wait for service). Other buckets 204b-204g similarly have associated queue depth ranges as illustrated in FIG. 4. Maintained for each bucket are two counters, such as illustrated by 208 of bucket 1 204a. The counters in 208 are the event count (EC) and the cumulative queue depth (CQD). The EC represents the number of events, such as new I/O requests received by the data storage system, associated with a particular bucket. The EC is incremented by 1 for each received I/O request selecting the bucket. The CQD represents the sum of the queue depths recorded for a bucket in accordance with an arriving event selecting the associated bucket. The CQD is incremented by the current queue depth determined for an arriving event which selects the associated bucket.

To further illustrate, I/O request 1 arrives at time t1 and the current queue depth=17. For the bucket queue depth ranges of FIG. 4, bucket 4 204d is selected. Both counters for bucket 4 are 0 and may be updated as follows: EC=1 and CQD=17. I/O request 2 arrives at time t1+1 and the current queue depth=18. Bucket 4 is again selected and the counters associated with bucket 4 are updated as follows: EC=2 (e.g., 1+1) and CQD=35 (e.g., 17+18).

In accordance with the techniques herein, the total idle time may also be maintained. The total idle time is not associated with any bucket and represents the total time that the wait queue is 0 and no I/O request is being serviced. In other words, the total idle time simply represents the amount of time the data storage system is not busy servicing an I/O request. As described in following paragraphs, this value may be used to determine estimated response times.

In one embodiment, the counters associated with each bucket as well as the total idle time may be monotonically increasing values. In other words, the counters are not reset with each polling interval or each time a set of data is reported. Rather, as illustrated in following paragraphs, changes in counter values for a given time period may be determined. When the polling interval or reporting time arrives, the current values of the total idle time and the counters for each bucket may be collected and reported, for example, by the data storage system to the management system, for further processing. It should be noted that in this particular example, the wait queue may represent the queue of I/O requests received by the data storage system waiting to be serviced and, accordingly, the idle time represents the amount of idle time with respect to the data storage system. As described elsewhere herein, a wait queue may be associated with a particular component rather than the entire data storage system. In such instances where the wait queue is associated with the particular component, the idle time represents the amount of idle time with respect to the particular component.

Figure 6:
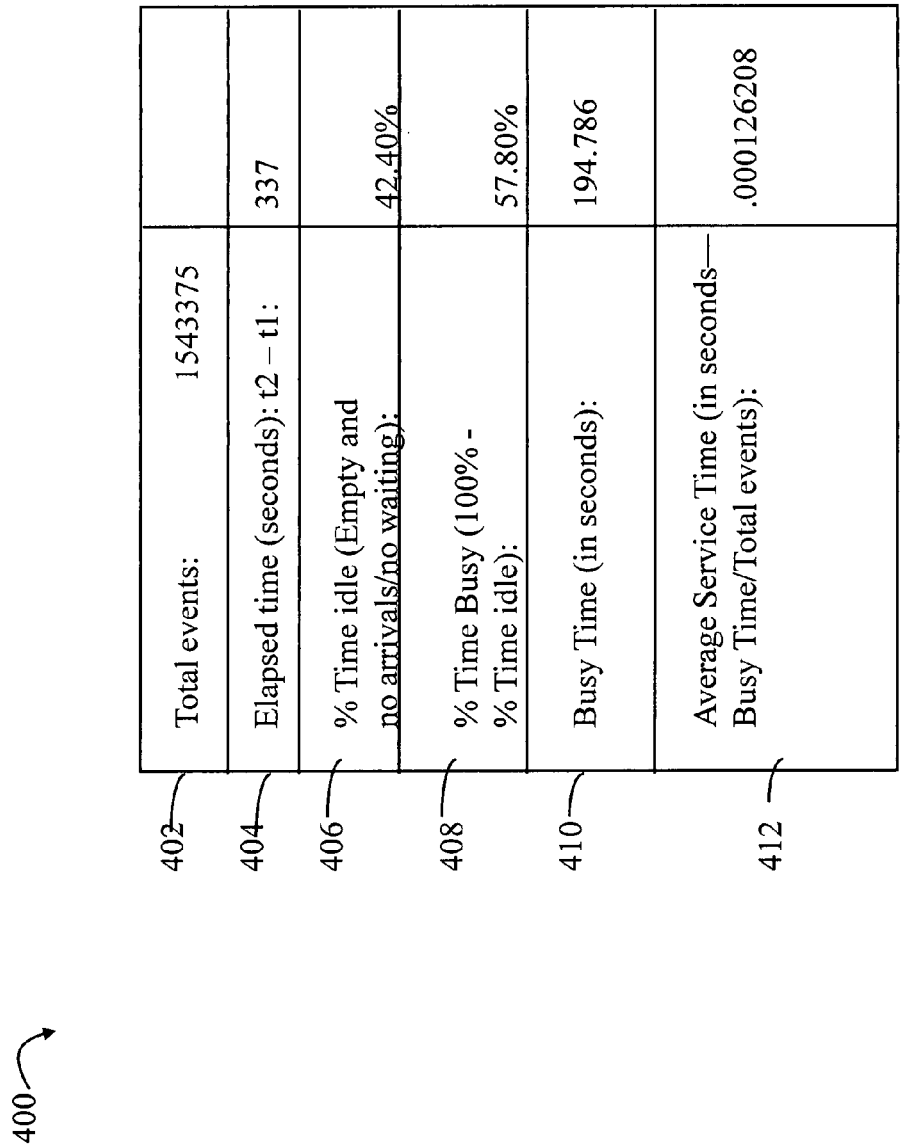

What will now be described with reference to FIGS. 5 and 6 are various derived values that may be determined using the data collected at each polling interval in accordance with the collected data for the polling interval. FIGS. 5 and 6 are in accordance with the buckets and associated queue depths as included in FIG. 4.

Referring to FIG. 5, the table 300 includes queue depths associated with the buckets in 302, event counts at time t1 304, event counts at time t2 306, change in event counts for t2−t1 308, cumulative queue depths at time t1 in 310 and time t2 in 312, change in cumulative queue depths for t2−t1 314, average queue depths 316, queue depth distribution 318, and average response times 320.

Referring to FIG. 6, the table 400 includes the total events 402, elapsed time in seconds 404, percentage idle time 406, percentage busy time 408, busy time in second 410, and the average service time 412.

Referring to FIG. 5, column 302 illustrates the various queue depths associated with each bucket from FIG. 4. Columns 304, 306 and 308 relate to the EC for the polling interval t2−t1, where t2 is the current time for which a set of data is reported and t1 represents the time associated with the previous set of reported data, and t2−t1 represents the elapsed time of the sampling period or polling interval. Column 304 represents the set of EC values for each bucket collected at polling time t1. Column 306 represents the set of EC values for each bucket collected at polling time t2. Column 308 represents, for each bucket, the change in EC from time t1 to t2. In other words, column 308 represents the number of I/O requests received by the data storage system during the sampling period of t2−t1 for each bucket. Column 310 represents the set of CQD values for each bucket collected at polling time t1. Column 312 represents the set of CQD values for each bucket collected at polling time t2. Column 314 represents, for each bucket, the change in CQD from time t1 to t2. In other words, column 308 represents the CQD as determined for each bucket during the sampling period of t2−t1.

For each bucket in column 302, an average queue depth (AQD) as indicated in column 316 may be determined. For a given bucket during a sampling period, the AQD for a bucket may be expressed as:

$$AQD \text{ (average queue depth)} = \frac{\text{Change in cumulative queue depth } (CQD)}{\text{Change in event count } (EC)}$$

where the changes in QD and EC are made with respect to the changes from a current time (e.g., t2) and a previous point in time (e.g., t1). For a given bucket corresponding to a row of the table in 300, the AQD in column 316 may be determined by dividing the value in column 314 (e.g., change in CQD) by the value in column 308 (e.g., change in EC).

Column 318 includes the queue depth distribution as may be determined in accordance with the buckets of 302. For a given bucket during a sampling period, the queue depth distribution may be expressed as:

Queue depth distribution=Change in event count (EC)/total events.

The total events is represented in 402 of FIG. 6 and determined as the sum of all values in column 308. For a given bucket corresponding to a row of the table in 300, the queue depth distribution percentages in column 318 may be determined by dividing the value in column 308 (e.g., EC for the sampling period) by the value in 402 of FIG. 6.

The queue depth distribution values in column 318 represent the percentage of I/O requests received during the time interval t2−t1 which fell into the associated bucket. For example, 70.43% of all received I/O requests during the time period t2−t1 each had to wait for between 1 and 5 other I/O requests to be serviced.

The average service time (AST) may be determined for all I/O requests received during the time interval t2−t1. The AST is indicated in 412 of FIG. 6. In this example, the AST is represented in seconds and may be expressed as:

AST=Busy time (in seconds)/total events where "busy time" represents the amount of time in seconds during the time interval t2−t1 that the data storage system was busy or not idle. The AST represents the average amount of time it takes to service an event, such as service the I/O request, during the time t2–t1.

In one embodiment in connection with data collected, a percentage of the amount of idle time (e.g., 406 of FIG. 6) may be sent from the data storage system to the management system. The value of 406 indicates the percentage of the elapsed time (e.g., t2–t1 404 of FIG. 6) that the data storage system was idle. Using the percentage of 406, the percentage of time that the data storage system was busy 408 during the elapsed time may be determined (e.g., 100%–value of 406). The value of 408 may be multiplied by the total elapsed time (e.g., t2–t1 404 of FIG. 6) to determine the "busy time" as represented in 410.

Based on the foregoing, the AST 412 for the elapsed time 404 may be determined dividing the value of 410 by the value of 402.

It should be noted that an embodiment may determine the busy time 410 using other calculations than as described herein depending on the data collected and reported.

For each bucket, an average response time (ART) may be determined and expressed as:

$$ART \text{ (in seconds)} = AST * (AQD+1)$$

As described elsewhere herein, the ART is the average amount of time that it takes to complete an I/O request associated with the bucket. The ART is based on the average amount of time it takes to perform the requested I/O operation (e.g., AST) and the average amount of time the I/O request waits. The average waiting time (AWT) for a first request in a bucket is based on the average number of I/O requests in the wait queue (e.g., the average queue depth for the bucket (AQD)) to be processed prior to servicing the first request. A quantity of 1 is added in this example to account for servicing the first request itself.

When describing the waiting time, in the worst case, a currently active request may have just started, and in the best case, the currently active request may have just completed. In estimating the AWT in one embodiment as described above, an assumption may be made that the currently active request has just completed so the response time for the new I/O request to complete is based on completing those currently waiting I/O requests to complete and then servicing the new I/O request (e.g., adding 1). It should be noted that rather than adding +1 in determining the AWT based on the foregoing assumptions regarding status of service for the I/O request currently being serviced as described above, an embodiment may make other assumptions and add factors other than 1.

For each bucket having a corresponding row in table 300, the ART in column 320 for the bucket may be determined as the product of the AST 412 of FIG. 6 for the elapsed time or polling interval multiplied by the quantity of the value in column 316+1 (e.g., AQD+1 as an estimate of the AWT for the bucket).

In one embodiment as described herein with reference to FIGS. 5 and 6, the values in columns 304 and 310 may be reported to the data management system by the data storage system at a first point in time. At a second point in time, such as the next polling interval, the values in columns 306 and 312 along with the percentage of idle time in 406 may be reported to the management system by the data storage system. Code on the management system may then process the received data to determine the other values of FIGS. 5 and 6 derived therefrom as described herein. It should be noted that, as described herein, if the ranges of the buckets do not span the entire range of possible queue depths, an additional counter, total events (e.g., 402 of FIG. 6), may also be reported at each polling interval. Otherwise, in an embodiment in which the total range or span of queue depths across the buckets included in an embodiment covers the entire range of possible queue depth values, the foregoing counter of the "total events" will equal the sum of the "event count" over all the buckets (e.g., sum of event counts per bucket as illustrated in FIG. 4) and may be derived, for example, by adding the values of column 308 of FIG. 4.

Figures 7A, 7B:
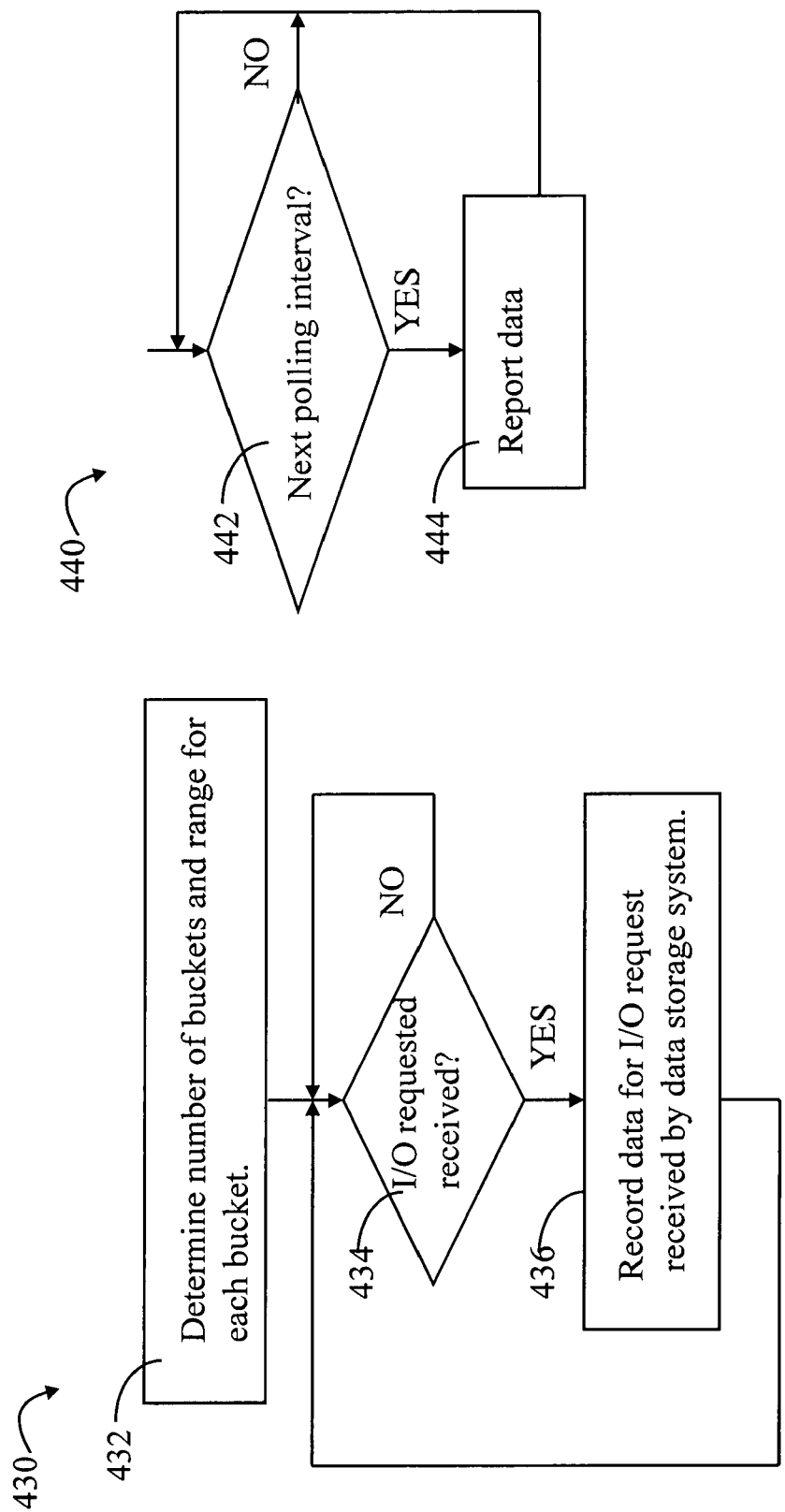
FIGS. 7A, 7B and 8 are flowcharts of processing steps that may be performed in an embodiment utilizing the techniques herein.
Figure 8:
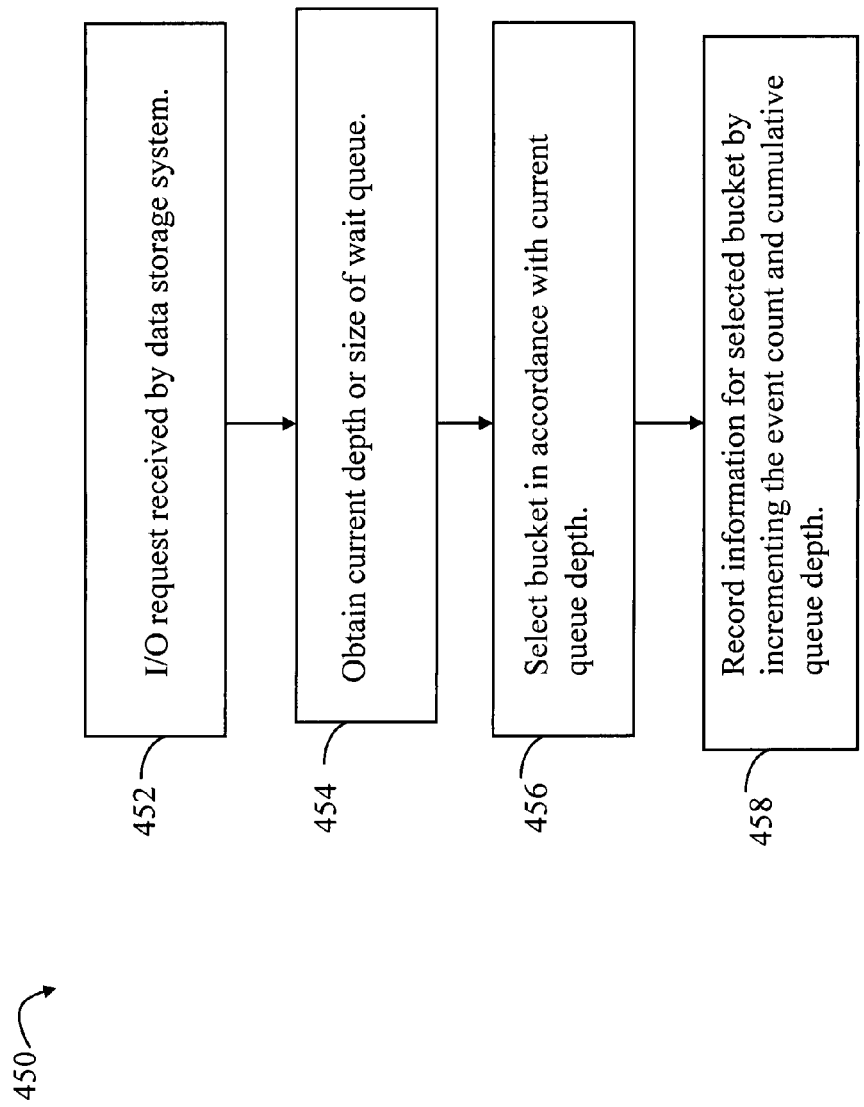

What will now be presented are flowcharts in connection with FIGS. 7A, 7B and 8 which summarize processing described above as may be performed in a system utilizing the techniques herein.

Referring to FIG. 7A, shown is a flowchart of processing steps that may be executed in an embodiment in connection with the techniques herein. The steps of FIG. 7A describe processing using a single wait queue for a data storage system. At step 432, the number of buckets and range of one or more queue depth values for each bucket are determined. This is illustrated, for example, in connection with FIGS. 3 and 4 described above. Step 432 may be performed as part of configuring the data storage system and associated data collection process for monitoring the data storage system. Steps 434 and 436 may be continually performed by the data storage system while the data storage system is servicing received I/O requests. At step 434, a determination is made as to whether an I/O request has been received. The data storage system continues to wait at step 434 until an I/O request is received. Control then proceeds to step 436. At step 436, data is recorded for the received I/O request. The data recorded in step 436 may be the information for a particular bucket as described elsewhere herein. Step 436 processing is described in connection with subsequent flowcharts in following paragraphs. From step 436, control returns to step 434 to wait and then process the next received I/O request.

Referring to FIG. 7B, shown is a flowchart of processing steps that may be performed by a data storage system in connection with collecting and reporting data used with the techniques herein. The steps of 440 may be continually performed while the data storage system and management system are online and utilize the techniques herein. At step 442, a determination is made as to whether the next polling interval has arrived. If not, step 442 continues to wait until such condition is true and then proceeds to step 444 to collect and report the data. At step 444, the data storage system may report the current counter values for each bucket and the amount of idle time for the polling interval to the management system. As described elsewhere herein, various techniques may be used in connection with triggering collection and reporting of the data from the data storage system such as, for example, issuing a request from the management system to the data storage system or having the data storage system proactively collect and report the data in step 444 at defined time intervals.

Referring to FIG. 8, shown is a flowchart of processing steps describing processing performed in connection with a received I/O request on the data storage system. Flowchart 450 describes in more detail processing of step 436 of FIG. 7A. At step 452, an I/O request is received by the data storage system. At step 454, the current depth or size of the wait queue is obtained. At step 456, a bucket is selected in accordance with the current queue depth determined in step 454. At step 458, information is recorded for the selected bucket by updating the EC and CQD for the selected bucket. As described above, the EC is incremented by 1 for the newly received I/O request and the CQD is incrementing the current queue depth value determined in step 454.

By recording the EC and CQD for each bucket, information regarding I/O events that may arrive in bursts, have longer service times, and the like, causing larger queue depths may be recorded. Using the techniques herein, the ART for the each bucket or range of queue depths may be derived, or indirectly determined, from the collected EC and CQD values. The techniques herein provide a distribution of the ART within a sampling period without requiring polling at more frequent intervals.

Each bucket may be characterized as representing a different activity level of the system based on how long it takes to process an event. The first bucket shows how many events encountered no wait with subsequent buckets showing how many events had increasingly larger waiting times. The larger waiting times may be due to one or more different causes such as, for example, due to I/O events arriving in bursts or groups, or events taking longer to service at a point in time.

Data illustrated in FIGS. 5 and 6 as may be associated with a polling interval or sampling period may be graphically presented for viewing.

Figure 9:
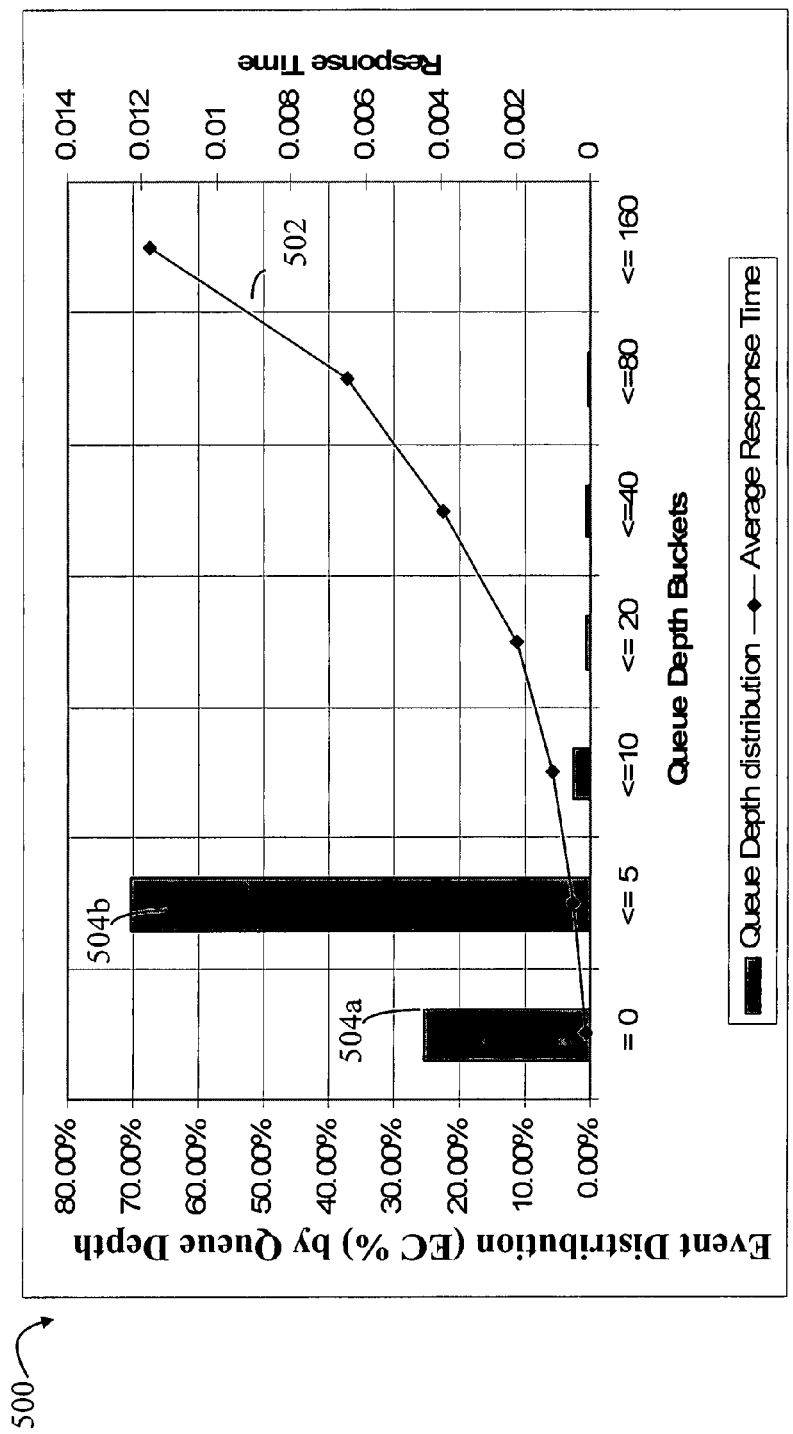
FIG. 9 is a graphical representation of information associated with a polling interval or sampling period determined in accordance with the techniques herein.

Referring to FIG. 9, shown is a graphical representation of the average response time and the percentage of events for the different queue depths (e.g., queue depth distribution). The X axis is labeled with the buckets and associated queue depths. Two pieces of data are illustrated in the second or Y dimension—the ART for each bucket as labeled on the right side of the graph (e.g., values from column 320 of FIG. 5) and the percentage of events that are included in each bucket for the lapsed time or polling interval as labeled on the left side of the graph (e.g., column 318 percentages). The example 500 graphically illustrates the ART for each bucket as indicated by line 502. Line 502 includes points determined using the ART information for each bucket from column 320 of FIG. 5. Each of the bars, such as 504*a* and 504*b*, represents the percentage of events for a particular bucket as included in column 318 of FIG. 5.

By determining the cumulative EC distribution of percentages, different QOS levels may be determined. FIG. 9 graphically illustrates facts presented in data of FIGS. 5 and 6. That is, more than 95% of all events (I/O requests in this example) received during the sampling period or polling interval have an average response time of less than 0.5 milliseconds (e.g., 0.0005 seconds) and almost 99% of these events received have an average response time of less than 1 millisecond. The foregoing may be determined by summing values from column 318 of FIG. 5 in accordance with selected ARTs from column 320. For example, bucket 2 associated with the second row of the table 300 has an ART of 0.477 milliseconds and bucket 3 associated with the third row of table 300 has an ART of 0.99 milliseconds. Adding the values in column 318 from rows 1 and 2 of the table 300 represents a cumulative percentage value of 95.91% (e.g., 25.48%+70.43%) and that 95.91% of all events had an ART equal to or less than the ART of bucket 2 (e.g., 0.000477 from second row of column 320). Adding the values in column 318 from rows 1, 2 and 3 represents a cumulative percentage value of 98.58% (e.g., (e.g., 25.48%+70.43%+2.67%) and that 98.58% (almost 99%) of all events had an ART equal to or less than the ART of bucket 3 (e.g., 0.00099 or almost 1 millisecond). The cumulative percentages of the events and ART values associated with the different buckets may be used to monitor different QOS levels as described above.

By keeping track of information based on varying queue depths per bucket, information can be recorded regarding I/O events that may arrive in bursts resulting in longer waiting queues. Longer queues may also be due to large amount of service times. The ARTs for the different buckets of a wait queue may be estimated using the data collected during a polling interval to more detail regarding how long I/O requests waited to be serviced for each bucket providing a distribution or window into the sampling interval without actually requiring sampling at smaller more frequent intervals.

As described above, the cumulative percentages of events associated with different buckets and ARTs associated with the buckets may be used in connection with monitoring levels of response times for QOS requirements. The techniques herein may be used to diagnose and identify system components causing delays due to unacceptable queue depths and associated ARTs observed for the components in a system. The techniques herein may also be used in connection with system planning. If large queue depths and ARTs are observed, appropriate action can be taken. For example, additional components and/or system resources may be needed to service the workload of a system or component at particular times.

The techniques herein provide a way to indirectly and analytically determined ARTs for each bucket without increasing the polling frequency. Typically, measuring response time is expensive. The techniques herein determine the ARTs indirectly using other measurements collected at each polling interval to provide more detailed information. If more accurate response times are needed within a polling interval or sampling period, the bucket granularity may be increased, for example, by defining bucket sizes of 1.

The information determined in accordance with the techniques herein may be used with other managing and monitoring QOS levels such as in SLAs specifying agreed levels of performance to be maintained. If there is an SLA, the techniques herein may be used to measure performance of the system in accordance with the specified QOS levels of the SLA. By monitoring queue depth and associated response times, proactive management of the data storage system or other system can be performed if bottlenecks (e.g, large ARTs and queue depths) are detected. Such responses may include, for example, modifying an existing system configuration, performing load balancing, allocating additional system resources needed at particular times in accordance with collected historical data, and the like. An action may be taken in response to observing and monitoring queue depths over a period of time to determine if there is a workload pattern. For example, if at a certain time each day the queue depth and associated waiting time is unacceptable, additional resources may be proactively allocated for use during this time each day. In other words, additional resources needed during this time period may be automatically allocated to handle the anticipated expected behavior based on previously collected data. The corrective action can be manual and/or automated, for example, using software adjusting the allocated resources at defined times of the day or when a particular queue depth or ART is detected during a sampling period. The techniques herein may be used with managing and monitoring a data storage system or individual components of the system each associated with a wait queue and determining information for the activity level distribution within each polling interval. In connection with example uses of the techniques herein, an event may correspond to receiving an I/O request by a data storage system. However, it will be appreciated by those skilled in the art that the techniques herein may be used in connection with other types of events in other systems.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for managing a wait queue in a system comprising:
defining a plurality of buckets associated with the wait queue, each of the plurality of buckets being associated with one or more queue depth values and one or more counters, each of the one or more queue depth values associated with said each bucket representing a possible value for a depth of the wait queue at a point in time indicating a total number of requests in the wait queue waiting to be serviced at said point in time, wherein said defining the plurality of buckets and associating the one or more queue depth values and the one or more counters with each of the plurality of buckets are performed prior to receiving requests for service;
receiving said requests for service; and
for each of said requests for service received, performing:
determining a current depth of the wait queue indicating all requests currently included in the wait queue waiting to be serviced;
selecting a bucket from said plurality of buckets based on the current depth of the wait queue and a first of one or more queue depth values associated with the bucket selected, wherein said bucket selected is associated with one or more queue depth values including the first queue depth value equal to the current depth of the wait queue;
recording information by updating said one or more counters of the bucket selected; and
placing said each request in the wait queue if there is another request currently being serviced or if there is at least one other request currently in the wait queue.

2. The method of claim 1, wherein the system is a data storage system and the wait queue is associated with all incoming I/O requests received by the data storage system.

3. The method of claim 1, wherein the one or more counters associated with each bucket include an event count and a cumulative queue depth, the event count representing a number of events associated with said each bucket as selected in said selecting step, the cumulative queue depth representing the sum of queue depths recorded for said each bucket in accordance with each occurrence of said selecting step selectin said each bucket.

4. The method of claim 3, wherein said selecting step selecting a first bucket further comprises:
incrementing by one the event count associated with the first bucket; and
incrementing the cumulative queue depth associated with the first bucket by the current depth of the wait queue.

5. The method of claim 1, further comprising:
reporting, in accordance with a polling interval, collected data, said collected data including values associated with said one or more counters for each of said plurality of buckets and a value indicating an amount of time the system is busy servicing requests.

6. The method of claim 5, further comprising:
determining, for each of said plurality of buckets, an average queue depth using the event count and cumulative queue depth associated with said each bucket.

7. The method of claim 6, further comprising:
determining an average service time for said polling interval, said average service time being determined in accordance with the elapsed time of said polling interval and a total number of requests received during the polling interval, the total number of requests determined by adding the event counts associated with said plurality of buckets.

8. The method of claim 7, further comprising:
determining, for each of said plurality of buckets, an average response time in accordance with the average queue depth for said each bucket and the average service time for said polling interval.

9. The method of claim 8, further comprising:
determining, for each of said plurality of buckets, a percentage of requests included in said each bucket in accordance with said event count for said each bucket and the total number of requests.

10. A method for managing a wait queue in a system comprising:
defining a plurality of buckets associated with the wait queue, each of the plurality of buckets being associated with one or more queue depth values and one or more counters, each of the one or more queue depth values representing a number of requests in the wait queue waiting to be serviced; and
for each received request for service, performing:
determining a current depth of the wait queue indicating a number of other requests included in the wait queue waiting to be serviced;
selecting a bucket from said plurality of buckets, said bucket being associated with a first of said one or more queue depth values equal to the current depth of the wait queue;
recording information by updating said one or more counters of the bucket selected; and
placing the received request in the wait queue if there is another request currently being serviced or if there is at least one other request currently in the wait queue, wherein the system is a data storage system and the wait queue is associated with all incoming I/O requests received by the data storage system, the one or more counters associated with each bucket include an event count and a cumulative queue depth, the event count representing a number of events associated with said each bucket as selected in said selecting step, the cumulative queue depth representing the sum of queue depths recorded for said each bucket in accordance with each received request selecting said each bucket, and wherein said selecting step selects a first bucket and further comprises:
incrementing by one the event count associated with the first bucket; and
incrementing the cumulative queue depth associated with the first bucket by the current depth of the wait queue; and wherein the method further comprising:
reporting, in accordance with a polling interval, collected data, said collected data including values associated with said one or more counters for each of said plurality of buckets and a value indicating an amount of time the system is busy servicing requests;
determining, for each of said plurality of buckets, an average queue depth using the event count and cumulative queue depth associated with said each bucket;
determining an average service time for said polling interval, said average service time being determined in accordance with the elapsed time of said polling interval and a total number of requests received during the polling interval, the total number of requests determined by adding the event counts associated with said plurality of buckets;

determining, for each of said plurality of buckets, an average response time in accordance with the average queue depth for said each bucket and the average service time for said polling interval;

determining, for each of said plurality of buckets, a percentage of requests included in said each bucket in accordance with said event count for said each bucket and the total number of requests; and determining a cumulative percentage value based on a sum of percentages of requests included in two or more buckets representing a range of queue depths associated with the wait queue, a first response time being the average response time associated with a first of said two or more buckets having a maximum queue depth of said range; and monitoring whether said system is performing in accordance with at least one quality of service level associated with a service agreement response time, said monitoring including comparing said cumulative percentage value to said at least one quality of service level associated with said service agreement response time.

11. The method of claim 1, wherein the system is a data storage system and the wait queue is associated with at least one component of the data storage system in connection with servicing I/O requests received by the data storage system which are serviced by the at least one component.

12. A method for monitoring performance of a data storage system comprising:

receiving configuration information for a wait queue, said configuration information defining a plurality of buckets associated with the wait queue, each of the plurality of buckets being associated with one or more queue depth values indicating a number of I/O requests and one or more counters, each of the one or more queue depth values associated with said each bucket representing a possible value for a depth of the wait queue at a point in time indicating a total number of I/O requests in the wait queue waiting to be serviced at said point in time, the wait queue including received I/O requests waiting to be serviced by at least one component of the data storage system;

defining the plurality of buckets and associating the one or more queue depth values and the one or more counters with each of the plurality of buckets prior to receiving I/O requests for service;

receiving said I/O requests for service;

for each of the I/O requests for service received, performing by the data storage system:
 determining a current depth of the wait queue indicating all I/O requests currently included in the wait queue waiting to be serviced;
 selecting a bucket from said plurality of buckets based on the current depth of the wait queue and a first of one or more queue depth values associated with the bucket selected, wherein said bucket that is selected is associated with one or more queue depth values including the first queue depth value equal to the current depth of the wait queue;
 recording information by updating said one or more counters of the bucket selected; and
 placing said each I/O request in the wait queue if there is another I/O request currently being serviced, or if there is at least one other I/O request currently in the wait queue;

reporting, by the data storage system in accordance with a polling interval, collected data to a management system, said collected data including values associated with said one or more counters for each of said plurality of buckets and a value indicating an amount of time the at least one component is busy servicing I/O requests; and determining, by the management system for each of said plurality of buckets, an average response time for said polling interval using said collected data for said polling interval.

13. A method for monitoring performance of a data storage system comprising:

receiving configuration information for a wait queue, said configuration information defining a plurality of buckets associated with the wait queue, each of the plurality of buckets being associated with one or more queue depth values indicating a number of I/O requests in the wait queue waiting to be serviced and one or more counters, the wait queue including received I/O requests waiting to be serviced by at least one component of the data storage system;

for each received I/O request to be serviced, performing by the data storage system:
 determining a current depth of the wait queue indicating a number of other I/O requests included in the wait queue waiting to be serviced;
 selecting a bucket from said plurality of buckets, said bucket being associated with a first of said one or more queue depth values equal to the current depth of the wait queue;
 recording information by updating said one or more counters of the bucket selected; and
 placing the received I/O request in the wait queue if there is another I/O request currently being serviced, or if there is at least one other I/O request currently in the wait queue;

reporting, by the data storage system in accordance with a polling interval, collected data to a management system, said collected data including values associated with said one or more counters for each of said plurality of buckets and a value indicating an amount of time the at least one component is busy servicing I/O requests; and determining, by the management system for each of said plurality of buckets, an average response time for said polling interval using said collected data for said polling interval;

determining a percentage value indicating a percentage of I/O requests included in two or more buckets for said polling interval, said two or more buckets representing a range of queue depth values associated with the wait queue, a first response time being the average response time associated with a first of said two or more buckets having a maximum queue depth of said range; and monitoring whether said at least one component of the data storage system is performing in accordance with at least one quality of service level associated with a service agreement response time, said monitoring including comparing said percentage value to said at least one quality of service level associated with said service agreement response time.

14. The method of claim 13, wherein, for said polling interval, said average response time for each of said plurality of buckets and a percentage of I/O requests associated with each of said plurality of buckets is displayed in graphical form at the management system.

15. A computer readable medium comprising code stored thereon for managing a wait queue in a data storage system, the computer readable medium comprising code stored thereon for:

defining a plurality of buckets associated with the wait queue, each of the plurality of buckets being associated with one or more queue depth values and one or more counters, each of the one or more queue depth values associated with said each bucket representing a possible value for a depth of the wait queue at a point in time indicating a total number of requests in the wait queue waiting to be serviced at said point in time, wherein said defining the plurality of buckets and associating the one or more queue depth values and the one or more counters with each of the plurality of buckets are performed prior to receiving requests for service;

receiving said requests for service; and for each of said requests for service received, performing:
    determining a current depth of the wait queue indicating all requests currently included in the wait queue waiting to be serviced;
    selecting a bucket from said plurality of buckets based on the current depth of the wait queue and a first of one or more queue depth values associated with the bucket selected, wherein said bucket selected is associated with one or more queue depth values including the first queue depth value equal to the current depth of the wait queue;
    recording information by updating said one or more counters of the bucket selected; and
    placing said each request in the wait queue if there is another request currently being serviced or if there is at least one other request currently in the wait queue.

16. The computer readable medium of claim 15, wherein the wait queue is associated with incoming I/O requests received by the data storage system.

17. The computer readable medium of claim 15, wherein the one or more counters associated with each bucket include an event count and a cumulative queue depth, the event count representing a number of events associated with said each bucket as selected in said selecting step, the cumulative queue depth representing the sum of queue depths recorded for said each bucket in accordance with each occurrence of said selecting that selects said each bucket, and said code for selecting selects a first bucket and further comprises code for;
    incrementing by one the event count associated with the first bucket; and
    incrementing the cumulative queue depth associated with the first bucket by the current depth of the wait queue.

18. The computer readable medium of claim 15, further comprising code for:
    reporting, in accordance with a polling interval, collected data, said collected data including values associated with said one or more counters for each of said plurality of buckets and a value indicating an amount of time the system is busy servicing requests.

19. A computer readable medium comprising code stored thereon for managing a wait queue in a data storage system, the computer readable medium comprising code stored thereon for:

defining a plurality of buckets associated with the wait queue, each of the plurality of buckets being associated with one or more queue depth values and one or more counters, each of the one or more queue depth values representing a number of requests in the wait queue waiting to be serviced; and for each received request for service, performing:
    determining a current depth of the wait queue indicating a number of other requests included in the wait queue waiting to be serviced;
    selecting a bucket from said plurality of buckets, said bucket being associated with a first of said one or more queue depth values equal to the current depth of the wait queue;
    recording information by updating said one or more counters of the bucket selected; and
    placing the received request in the wait queue if there is another request currently being serviced or if there is at least one other request currently in the wait queue;

reporting, in accordance with a polling interval, collected data, said collected data including values associated with said one or more counters for each of said plurality of buckets and a value indicating an amount of time the system is busy servicing requests;

determining, for each of said plurality of buckets, an average queue depth using the event count and cumulative queue depth associated with said each bucket;

determining an average service time for said polling interval, said average service time being determined in accordance with the elapsed time of said polling interval and a total number of requests received during the polling interval, the total number of requests determined by adding the event counts associated with said plurality of buckets; and determining, for each of said plurality of buckets, an average response time in accordance with the average queue depth for said each bucket and the average service time for said polling interval.

20. The computer readable medium of claim 19, further comprising code for:
    determining, for each of said plurality of buckets, a percentage of requests included in said each bucket in accordance with said event count for said each bucket and the total number of requests;
    determining a cumulative percentage value based on a sum of percentages of requests included in two or more buckets representing a range of queue depths associated with the wait queue, a first response time being the average response time associated with a first of said two or more buckets having a maximum queue depth of said range; and
    monitoring whether said system is performing in accordance with at least one quality of service level associated with a service agreement response time, said monitoring including comparing said cumulative percentage value to said at least one quality of service level associated with said service agreement response time.

* * * * *